(12) United States Patent
Szolyga et al.

(10) Patent No.: US 8,873,574 B2
(45) Date of Patent: Oct. 28, 2014

(54) NETWORK-ATTACHED STORAGE DEVICE HAVING A CONNECTION TO A LOCAL USER DEVICE

(75) Inventors: Thomas H. Szolyga, Saratoga, CA (US); Mike McCullough, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2772 days.

(21) Appl. No.: 11/188,683

(22) Filed: Jul. 25, 2005

(65) Prior Publication Data
US 2007/0022218 A1    Jan. 25, 2007

(51) Int. Cl.
*G06F 15/16*    (2006.01)
*H04L 29/08*    (2006.01)

(52) U.S. Cl.
CPC ............ *H04L 67/1097* (2013.01); *H04L 67/34* (2013.01)
USPC ...... 370/463; 370/462; 370/431; 370/395.71; 370/395.72; 709/250; 709/212; 709/203

(58) Field of Classification Search
CPC ..... G06F 15/16; G06F 3/0689; G06F 1/3202; G06F 1/3209
USPC ............... 370/463, 462, 431, 395.72, 395.71; 709/203, 232, 212, 213
See application file for complete search history.

(56) References Cited

U.S. PATENT DOCUMENTS

| | | |
|---|---|---|
| 2003/0046335 A1 | 3/2003 | Doyle et al. |
| 2005/0109841 A1 | 5/2005 | Ryan et al. |
| 2005/0144406 A1 | 6/2005 | Chong, Jr. |
| 2006/0208066 A1* | 9/2006 | Finn et al. ............ 235/380 |
| 2007/0073918 A1* | 3/2007 | Ohnishi ............ 710/14 |

FOREIGN PATENT DOCUMENTS

| | | |
|---|---|---|
| CN | 1522061 | 8/2004 |
| DE | 101 31 299 | 1/2003 |
| JP | 2001357008 | 12/2001 |
| JP | 2004310621 | 11/2004 |
| JP | 2005157713 | 6/2005 |
| JP | 2005196422 | 7/2005 |
| TW | I256550 | 6/2006 |

OTHER PUBLICATIONS

European Patent Office, Extended Search Report for EP Application No. EP06014940.8 dated Nov. 6, 2006 (6 pages).

* cited by examiner

*Primary Examiner* — Jamal Javaid

(57) ABSTRACT

A network-attached storage apparatus is configured to be in communication with a local device. The apparatus includes storage devices for storing data, one interface for establishing communication with the network and another interface for establishing communication with the local device. A processor enables the interfaces to alternatively establish communication with the local device or the network.

14 Claims, 3 Drawing Sheets

NETWORK-ATTACHED STORAGE DEVICE HAVING A CONNECTION TO A LOCAL USER DEVICE

FIELD OF INVENTION

The present invention relates to network technology, and in particular, to a network-attached storage (NAS) device configured to enable direct transfer of data to and from a local user device outside the network.

BACKGROUND OF THE INVENTION

Network-attached storage (NAS) devices are widely used in a network environment for storing data from, and sharing data with, network devices in the network. Typically, NAS devices include one or more disk drives for storing data to be used in the network. The connections or interface between NAS devices and the network is typically through Ethernet. Current implementations of NAS devices rely on the speed of the network interface to load and off-load potentially large amounts of user data. This requires the user device such as a computer connected to the network that is loading the NAS device with data, to remain turned on and execute the transfer application. When the user device is performing the transfer of large amounts of data (e.g., as when initially loading the NAS device) this process can take an unacceptably long time. For example, in a NAS device with a LAN interface having a speed of approximately 100 Mbps, the transfer time of a 250 GB data size could take as long as fourteen hours. In the consumer space, for example, waiting such a long time is unacceptable, and the consumer would likely decide the system is not operational.

SUMMARY OF THE INVENTION

The preferred embodiment of the present invention is directed to a network-attached storage apparatus which is configured to be in communication with a local device. The apparatus includes storage devices for storing data, one interface for establishing communication with the network and another interface for establishing communication with the local device. A processor enables the interfaces to alternatively establish communication with the local device or the network.

DETAILED DESCRIPTION OF THE INVENTION

Broadly stated, the preferred embodiment of the present invention is directed to a network-attached storage (NAS) device for storing data shared by a network to which the NAS device is connected. The NAS device includes a local device interface, in addition to a network interface, for enabling direct connection, i.e., without going through the network, between the local device and the NAS device. The local device interface communicates with the local device through a high-speed bus connection (such as a USB 2.0 bus or an IEEE 1394 bus) that enables significantly faster transfer of large amounts of data to and from the NAS device, than through the connections (such as Ethernet) that are used between the network and the NAS device. The present invention is advantageous especially when initially loading the NAS device with a large amount of data, or any time a faster data transfer is desired.

Figure 1:
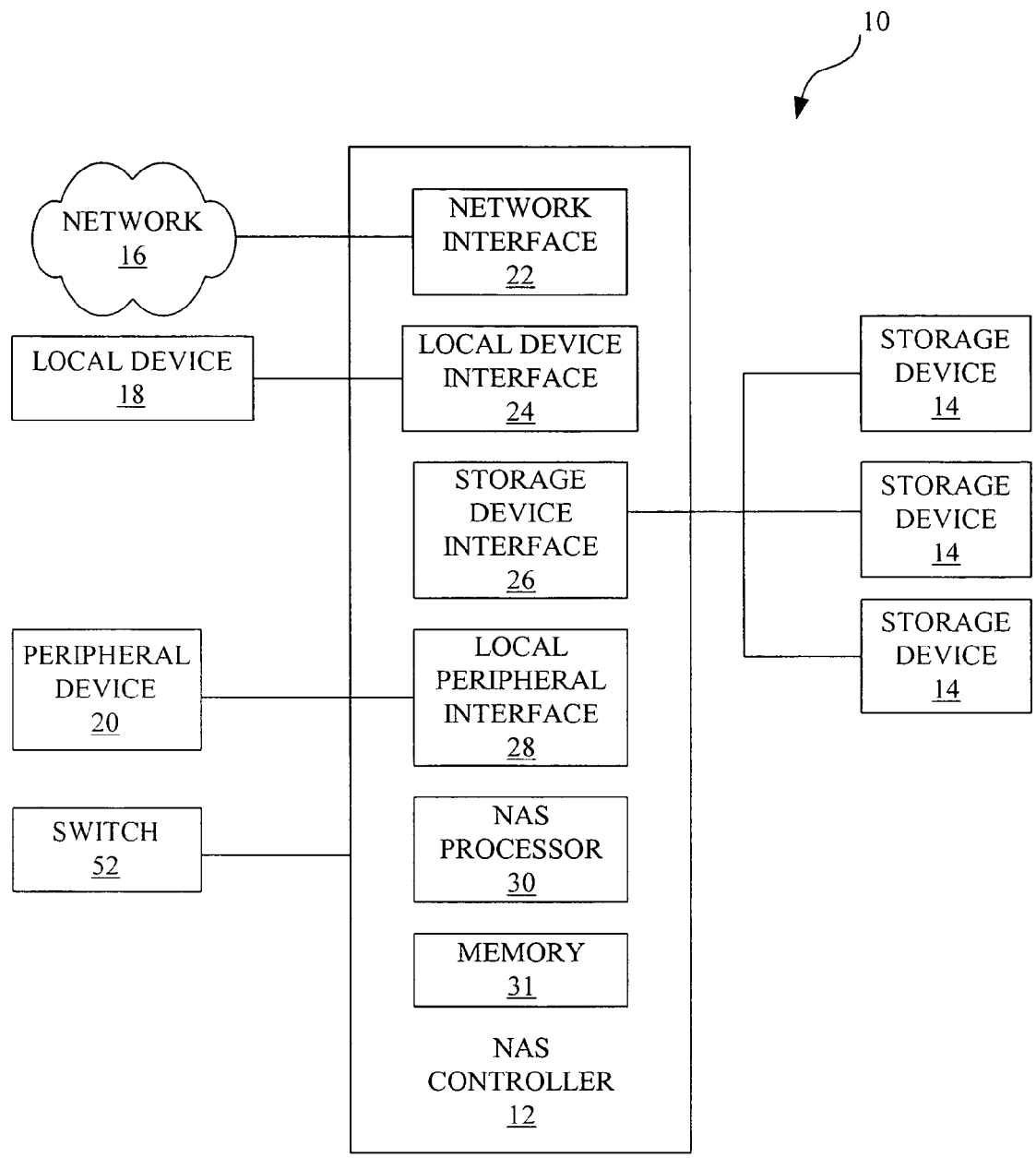
FIG. 1 is a block diagram of a network-attached storage device in accordance with one embodiment of the present invention.

Turning now to FIG. 1, a network-attached storage (NAS) device 10 in accordance with one embodiment of the present invention includes an NAS controller 12 and a number of storage devices 14 (three shown in the figure). The NAS device 10 is configured to be in communication with a network 16, a local device 18 such as a PC or a workstation, and a peripheral device 20 such as a print server.

The NAS controller 12 includes a network interface 22 for enabling connection with and transferring data to and from the network 16, and a local device interface 24 which enables transfer of data to and from the local device 18. A storage device interface 26 is configured to be in communication with the storage devices 14 for obtaining status information of the storage devices and facilitating data transfer between the storage devices 14 and the network 16 or the local device 18. A local peripheral interface 28 enables transfer of data to and from the network 16 or the local device 18 to the peripheral device 20. A NAS processor 30 overseas the overall operations of the NAS controller 12 and coordinates functions between various components 22, 24, 26, 28 of the NAS controller described above. A memory 31 is provided to store the necessary programs for enabling the NAS processor 30 to perform its functions.

The NAS controller 12 also organizes the data in the storage devices 14 in several ways. These include but are not limited to JBOD (just a bunch of discs), RAID 0 (striping data across multiple storage devices to achieve higher capacity and/or performance), RAID 1 (mirroring data across multiple storage devices to achieve full redundancy and higher data integrity), and RAID 5 (a combination of RAID 0 and RAID 1).

Figure 2:
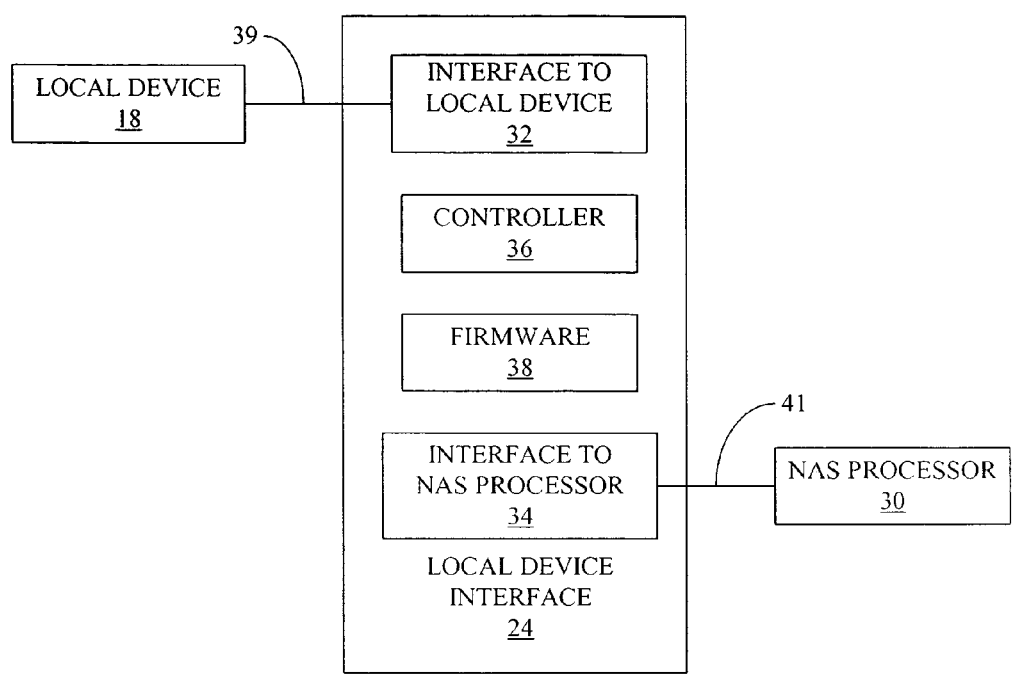
FIG. 2 is a block diagram of a local device interface in the network-attached storage device shown in FIG. 1.

Referring to FIG. 2, the local device interface 24 of the NAS controller 12 includes an interface 32 for establishing a connection and enabling communication with the local device 18. A processor interface 34 is provided for enabling the local device interface 24 to communicate with the NAS processor 30. A controller 36 controls the functions of the two interfaces 32, 34 to allow transfer of data between the local device 18 and the NAS controller 12, in accordance with a program embedded in a firmware 38. The connection between the interface 32 and the local device 18 is made through a high-speed bus 39 such as USB 2.0 or IEEE 1394, and the connection between the interface 34 and the NAS processor 30 may also be through a bus 41 such as PCI or PCI-Express, which are typically used in NAS controllers utilized in NAS devices.

Figure 3:
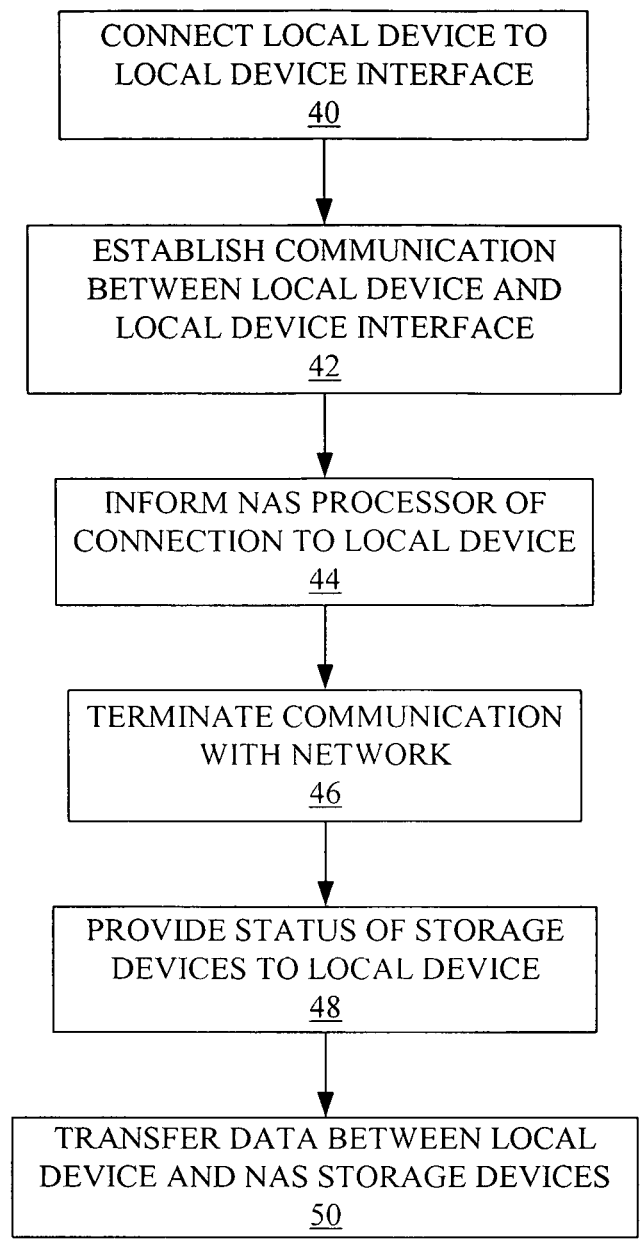
FIG. 3 is a flowchart describing a connection process between a local device and the network-attached storage device.

Referring now to FIG. 3, an operation for establishing a communication between the local device 18 and the NAS device 10 is described. When the local device 18 is not connected to the NAS device 10, the NAS controller 12 functions as if the local device interface 24 is not present. In other words, the NAS controller 12 performs the typical functions with respect to the network 16, for example, transferring data between the network 16 and the storage devices 14, or transferring data from the network to the local peripheral device 20.

When the local device 18 makes a physical connection with the local device interface 24, as when a bus 39 is plugged into the interface 32 of the local device interface (block 40), the controller 36 of the local device interface establishes a communication with the local device using USB 2.0 data transfer protocol, for example (block 42). The controller 36 then informs the NAS processor 30 of the connection between the NAS device 10 and the local device 18 (block 44) via the processor interface 34.

Upon receiving information that the local device 18 has been connected to the NAS device 10, the NAS processor 30 terminates communication with the network 16 (block 46), and provides information on the status of the storage devices 14 to the local device 18 (via the processor interface 34, the controller 36 and the interface 32) based on the information obtained from the storage device interface 26 (block 48). The status of the storage devices 14 might be information such as, for example, the capacity of the storage devices, the file structure of the storage devices, a fact table, or an NTFS table. In other words, the information enables the local device 18 to know the type of storage devices 14 that are available and their capacity. It should be appreciated that by providing information regarding the storage devices 14 to the local device 18 in this manner, the local device treats the storage devices 14 as being connected directly to the local device. The NAS device 10 then transfers data between the local device 18 and the storage devices 14 (block 50).

In one embodiment, the transfer of data between the local device 18 and the storage devices 14 is similar to a transfer of data between a computer and external disk drives. The local device 18 would see the local device interface 24 as a disk controller, and send packets of command and/or data as well as receive status and/or data to and from the local device interface 24. The NAS processor 30 in conjunction with a control program stored in the local memory 31 interprets these packets and executes a plurality of operations within itself and with the storage devices 14. The operations performed by the NAS processor 30 include, but are not limited to, RAID partitioning of the data, management of the data layout table (not shown) in the storage devices 14, allocation of blocks of storage in the storage devices 14 and creation of status packets of information to return to the local device 18. The operations with the storage devices 14 include, but are not limited to, obtaining storage device status, positioning the data to a specific read or write location in the storage devices, and transferring data to the storage devices.

Referring back to FIG. 1, in accordance with another embodiment of the present invention, a switch 52 is connected to the NAS controller 12. Switch 52 has a network mode and a local mode for enabling the user to manually instruct the NAS processor 30 the mode in which to operate. In the network mode, the NAS controller 10 functions normally, providing file access through the network interface 22. In the local mode, the NAS controller 10 functions as a disk controller, accepting commands and data destined for storage device 14 from the local device interface 24, as described above in blocks 42 to 50.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A network-attached storage device configured to be in communication with a local device, comprising:
   a plurality of storage devices to store data;
   a first interface to establish communication with a network;
   a second interface to establish communication with the local device;
   at least one processor to:
      selectively enable the second interface to establish communication with the local device;
      perform RAID (Redundant Array of Independent Disks) partitioning of the data stored in the plurality of storage devices, where the RAID partitioning of the data comprises organizing the data across the plurality of storage devices according to a RAID storage technique; and
      provide status information of the plurality of storage devices to the local device in response to detecting connection of the local device to the network-attached storage device, wherein the status information includes a file structure of the data stored in the plurality of storage devices; and
   a peripheral device interface to transfer data between the network or the local device and a peripheral device connected to the network-attached storage device.

2. The network-attached storage device of claim 1, wherein the second interface is to communicate with the local device over a USB bus.

3. The network-attached storage device of claim 1, wherein the second interface is to communicate with the local device over an IEEE 1394 bus.

4. The network-attached storage device of claim 1, wherein the at least one processor is to enable the first interface to establish communication with the network when there is no communication between the second interface and the local device.

5. The network-attached storage device of claim 1, further comprising a switch, the switch when set to a first mode selectively instructing the at least one processor to enable the second interface to establish communication with the local device, and the switch when set to a second mode selectively instructing the at least one processor to enable first interface to establish communication with the network.

6. The network-attached storage device of claim 1, further comprising a storage device interface to access data stored in the plurality of storage devices.

7. The network-attached storage device of claim 1, wherein the at least one processor is to further:
   terminate communication between the network-attached storage device and the network in response to detecting connection of the local device to the network-attached storage device.

8. The network-attached storage device of claim 1, wherein organizing the data comprises striping the data across the plurality of storage devices.

9. The network-attached storage device of claim 1, wherein providing the status information allows the local device to treat the plurality of storage devices as being connected directly to the local device.

10. A method comprising:
    storing, by a network-attached storage device that includes a first interface, a second interface and a peripheral device interface, data in a plurality of storage devices;
    communicating, by the network-attached storage device, with a network through the first interface;
    communicating, by the network-attached storage device, with a local device through the second interface;
    selectively enabling, by at least one processor in the network-attached storage device, the second interface to establish communication with the local device;

transferring data between the network or the local device and a peripheral device through the peripheral device interface;

performing, by the at least one processor, RAID (Redundant Array of Independent Disks) partitioning of the data across the plurality of storage devices, where the RAID partitioning of the data comprises organizing the data across the plurality of storage devices according to a RAID storage technique; and in response to detecting connection of the local device to the network-attached storage device, providing, by the at least one processor, status information of the plurality of storage devices to the local device, wherein the status information includes a file structure of the data stored in the plurality of storage devices.

11. The method of claim 10, wherein communicating with the local device through the second interface is over a USB bus.

12. The method of claim 10, further comprising:

setting a switch to a first mode to selectively instruct the at least one processor to enable the second interface to establish communication with the local device; and setting the switch to a second mode to selectively instruct the at least one processor to enable the first interface to establish communication with the network.

13. The method of claim 10, further comprising:

terminating, by the at least one processor, communication between the network-attached storage device and the network in response to detecting connection of the local device to the network-attached storage device.

14. The method of claim 10, wherein organizing the data comprises striping the data across the plurality of storage devices.

* * * * *